United States Patent [19]

Masri

[11] 4,429,496

[45] Feb. 7, 1984

[54] METHOD AND APPARATUS FOR ACTIVE CONTROL OF FLEXIBLE STRUCTURES

[75] Inventor: Sami F. Masri, Pasadena, Calif.

[73] Assignee: University of Southern California, Los Angeles, Calif.

[21] Appl. No.: 219,699

[22] Filed: Dec. 24, 1980

[51] Int. Cl.³ .................. F16M 13/00; E04H 9/02
[52] U.S. Cl. .................................... 52/1; 52/167; 52/741; 248/638
[58] Field of Search ............... 52/1, 167, 24, 27, 83, 52/741, 742; 248/638

[56] References Cited

U.S. PATENT DOCUMENTS 3,973,078 8/1976 Wolf ........................................ 52/167
4,328,941 5/1982 Phillips ................................ 248/638

FOREIGN PATENT DOCUMENTS 681394 3/1964 Canada ................................... 52/573
967861 8/1964 United Kingdom ................ 248/638

OTHER PUBLICATIONS

Architectural Record, Jun. 1978, pp. 114–116.

Primary Examiner—John E. Murtagh
Attorney, Agent, or Firm—Nilsson, Robbins, Dalgarn, Berliner, Carson & Wurst

[57] ABSTRACT

A method and apparatus for active control of flexible structures subjected to shocks such as earthquake ground motion. In a first embodiment, the deflection of the structure beyond a prescribed threshold triggers a corrective pulse of mechanical energy which is applied within one period of the structure's lowest mode of vibration. The pulse serves to disorganize the buildup of harmonic motion. In a second embodiment, a pulse, calculated at each deflection cross-over point (during vibration), is applied to the structure in a direction opposite to that of its instantaneous velocity to effect damping of the motion.

11 Claims, 12 Drawing Figures

METHOD AND APPARATUS FOR ACTIVE CONTROL OF FLEXIBLE STRUCTURES

FIELD OF THE INVENTION

The present invention relates to methods and apparatus for minimizing the vibration of a structure when subjected to transient, as opposed to regular, forces.

BACKGROUND AND SUMMARY OF THE INVENTION

Designs of flexible structures such as buildings, aircraft, radar installations, solar panels and the like are generally efficient and cost effective with regard to regular periodic loading. This is, in large measure, a result of the fact that this type of loading occurs during a substantial percentage of the lifetime of the structure. Hence, the design is often "on line" to counter these stresses. Although "regular" loading will vary according to the particular structure and its method of use, well-known methods of structural analysis (often computer-aided) achieve high levels of efficiency in the maintenance of deflections within tolerable bounds.

Unfortunately, structural designs must anticipate a certain amount of non-periodic or transient loading. Earthquakes, wind gusts and the like subject structures to deterministic as well as non-stationary random excitations. Efficient, cost-effective design in light of such real-life situations poses difficult problems. Commonly, a large degree of redundancy is incorporated into structures to counteract such forces. Redundancy, by its utilization of substantial additional materials, directly adds to the cost of the structure and, in the case of airborne designs, can substantially increase operating costs.

Some attempts have been made to avoid overdesign for redundancy by "active" as opposed to "passive" methods of vibration control. In this class is included devices such as vibration or mass dampers. Such devices, discussed by S. F. Masri and L. Yang in "Earthquake Response Spectra of Systems Provided with Non-Linear Auxiliary Mass Dampers," (Paper No. 372, Proceedings 5WCEE, Roome (1973)), may be designed for both linear and nonlinear damping. They rely, to a large extent, on the principles of momentum transfer and energy dissipation.

A major drawback of mass dampers is that the forces they exert upon a vibrating structure do not always occur at the proper point in time for optimum reduction of motion and system stress. Thus, an "effective" mass damper may allow an undesirable amount of stress to occur before its effect is realized.

The present invention overcomes the drawbacks of the prior art by providing methods and apparatus for minimizing the stress encountered by a flexible structure when subjected to a shock. The method generally includes sensing the state of the structure in response to the shock. The value of at least one corrective (i.e., motion-attenuating) pulse is then calculated or transmitted in response to the state. Once calculated, a corrective pulse is then applied to the structure to achieve the desired result.

A system is provided by the present invention for practicing the aforesaid method. The system includes a sensor to detect the state of the structure, means responsive to its state to produce a control signal and at least one pulse generator responsive to the signal. Additionally included within the scope of the invention is a building including a flexible main frame engaged to the aforesaid system.

The above and additional features will become apparent from the following detailed description wherein like numerals represent like parts throughout.

DETAILED DESCRIPTION

Figure 1:
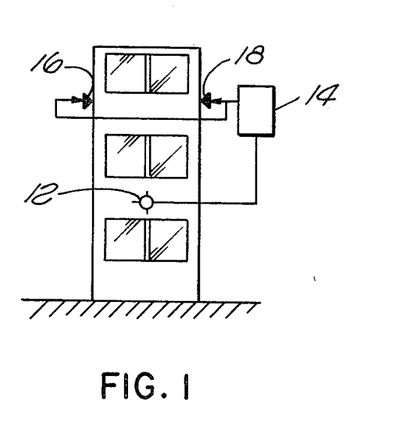
FIG. 1 is a schematic view of the system of the present invention adapted to the control of a flexible structure.

FIG. 1 is an illustration of the system of the present invention for controlling the motion of a building. Although adaptable to the control of an arbitrary structure, the system is shown engaged to the three-story structure for consistency with the analysis which follows. A sensor 12 is associated with the building. The sensor 12, calibrated to detect the endogenous state variables of the structure (which are utilized to calculate the corrective pulse stream of the open-loop system), may be any of a number of conventional guages or the like. Sensors of such type act as transducers to produce a signal output which is either an analog or digital representation of the measured variables. Appropriate sensing circuitry is well known, often comprising an arrangement of simple nonlinear elements including operational amplifiers and the like.

The output signal from the sensor 12 is applied to controller circuitry 14 which includes a computing capability—either analog or digital. Various commercially-available microcomputers, including the PDP 1134 manufactured by the Digital Electronics Corporation of Maynard, Mass., possess sufficient computational power to enable the controller 14 to make all open-loop computations necessary for producing necessary control signals within time constraints which will become evident from the discussion to follow. The control signals generated by the circuitry are applied to a pair of pulse generators 16, 18. The pulse generators may be any of a number of means capable of producing sufficient thrust to apply a substantial unidirectional pulse of energy to the building over a relatively short period of time. Included among appropriate apparatus are gas pulse generators, rocket engines, and the like which can produce a mechanical pulse of about 10,000 pounds peak force of about twenty to fifty milliseconds' duration. Pulse generator technology is discussed by S. F. Masri and F. B. Safford in "Analytical and Experimental Studies of a Mechanical Pulse Generator," *Jour-*

*nal of Engineering for Industry* (ASME), Series B, Vol. 96 No. 2, pp. 459–470 (May 1974). The pulse generators 16, 18 are paired, the application of a force by one being arbitrarily characterized as a "positive" pulse and that by the other a "negative" pulse.

The system disclosed is utilized to apply pulses of short duration and high energy to the flexible structure. The pulses limit the vibration stress encountered by the building in reaction to a significant shock. One method of operation of the system of FIG. 1 utilizes pulses to disorganize the harmonic motion of the structure whereas a second method, discusssed later, applies pulses to achieve active, nonlinear motion damping.

It is known that maximum deflection (and structure stress) occur in a harmonic vibration mode. The total corrective force applied to the structure by means of the present invention need not be very large to counteract the massive amount of energy applied to the structure by an earthquake when the force (corrective pulse) is properly applied to disorganize its harmonics. The first preferred embodiment of the method of the invention utilizes the fact that many uninterrupted system periods are required for harmonic motion to reach peak response (maximum stress) levels. Each disorganizing pulse, in addition to dissipating energy in a harmless manner, postpones the buildup of substantial motion until the total energy imparted by the initial shock is dissipated in a series of low-amplitude vibrations. The second method seeks to time the application of the pulse to achieve maximum dissipation of energy per pulse for efficient nonlinear damping of structure motion.

Alternate algorithms provide control strategies for selecting and applying the corrective pulses. In each instance, a pulse train $\hat{P}_r(t)$ is derived by the controller circuitry 14 from the state variables of displacement ($x(t)$) and velocity ($\dot{x}(t)$) as detected by the sensor 12. $\hat{P}_r(t)$ is then applied to the building by one of the pulse generators 16, 18. In a first embodiment, $\hat{P}_r(t)$ is derived only for vibrations whose amplitude exceeds a deflection threshold $-y_r$. The value of $\hat{P}_r(t)$ is then calculated to minimize a non-negative cost (i.e., amount of stress) function representative of the strain or kinetic energy of the building. The corrective or disorganizing pulse of energy must be applied to the building within one period of its lowest harmonic following threshold-exceeding motion. (Typically, the fundamental period of a multi-story structure is about one-tenth of a second per floor.) The application of the force within one time period assures that the energy pulse will not increase the building's motion. In addition, it is recognized that a structure's lowest order modes produce the most harmful motion; hence, higher order modes, which would allow, of course, less response time, may be neglected.

Figure 2:
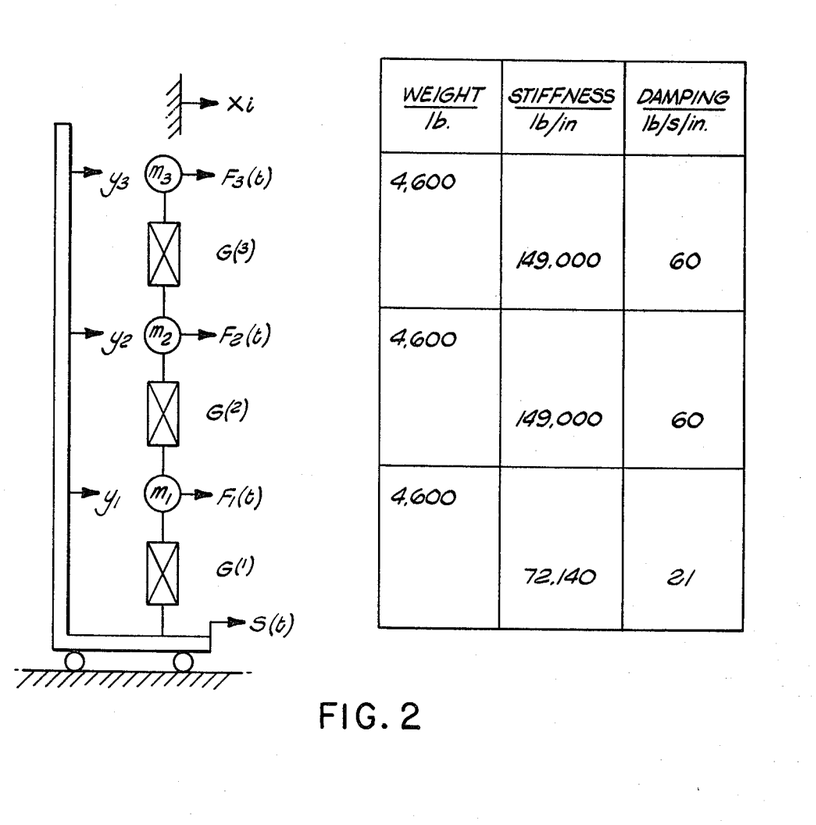
FIG. 2 is an idealized linear model of a three story building for analyzing the present invention.

The information concerning the motion of the structure and its strain energy may be analytically derived from an appropriate mathematical model or simulation of the particular structure. Various system characterization techniques exist for deriving a model appropriate for use in the practice and calculations of the method. FIG. 2 is a schematic of an idealized three-story building frame developed at the University of California at Berkeley. The chart next to the model discloses its significant numerical parameters for purposes of computation. A mathematical analysis of this structure and consequent derivation of $\hat{P}_r(t)$ follows. The computations are based upon an assumed linearity of response. Such an assumption is often a useful working approximation to a flexible structure. Other assumptions may lead to a derivation of other forms of $\hat{P}_r(t)$. However, these analyses remain within the scope of the present invention insofar as they employ analytical techniques to calculate at least one pulse $\hat{P}_r(t)$.

ANALSYIS OF FIRST CONTROL TECHNIQUE

Referring to the linear structure of FIG. 2, the absolute displacement of location or floor i is $x_i(t)$ and its relative motion with respect to its base undergoing arbitrary motion $S(t)$ is:

$$y_i(t) = x_i(t) - S(t), \quad i = 1, 2, \ldots n \quad (1)$$

It is desired to mitigate, by appropriate control pulses, the damage to the structure resulting from excessive deformations $y_i(t)$. Threshold levels $y_{ri}$ ($i = 1, 2, \ldots, n$) of deformations at the monitored locations, are established on the basis of design considerations. These levels—used in conjunction with the control logic—trigger systems controllers.

In the absence of control forces, the equation of motion of the system shown in FIG. 2 is $$[m]\ddot{y} + [c]\dot{y} + [k]y = -[m]\underline{e}\ddot{S}(t) \quad (2)$$

where
 $y(t) = \text{col.}(y_1, y_2, \ldots y_n)$,
 $[m], [c],$ and $[k]$ are mass, damping, and stiffness matrices,
 $\underline{e} =$ a unit vector of order $n = (1, 1, \ldots, 1)$, and
 $\ddot{S} =$ ground acceleration.

Assuming that, at time $t_o$, a decision has been made to trigger an array of pulse controllers located at selected points in the structure, the problem may be formulated as the selection of optimum pulse characteristics to minimize an appropriate cost function. The control pulses are constrained to satisfy the condition $$P_i(t) = p_i p_o(t), \quad i = 1, 2, \ldots, n \quad (3)$$

where $p_i$ is the amplitude of the pulse at location i, and $p_o(t)$ is an arbitrary time history. Note that Eq. (1) implies the following assumption: (a) all the pulses are initiated at the same time and (b) they maintain a constant amplitude ratio, with respect to each other, every time a pulse is initiated.

In order to optimize (minimize) the motion of the system over a relatively short time segment $T_{opt}$, it is first assumed that the system motion consists of a stochastic component superimposed on top of a deterministic component. The pulse amplitudes are then selected to minimize the deterministic (expected value) component of the motion.

$$\text{Let } \underline{p}(t) = \underline{p} p_o(t) \quad (4)$$

where $p = \text{col.}(p_1, p_2, \ldots, p_n)$

In order to account for the cases where controllers are to be applied only at certain locations NP, the reduced-order vector $\underline{p}_r$ is related to $\underline{p}$ by $$\underline{p} = [w_2] \underline{P}_r \quad (5)$$

where $[w_2]$ is a constant matrix of order $n \times NP$, and $\underline{P}_r$ is a vector of order NP, containing the amplitude of the operating pulses.

Neglecting the mean value of the earthquake excitation during the period $t_o$ to $T_o = (t_o + T_{opt})$, the system response is then given by the solution of $$[m]\ddot{y} + [c]\dot{y} + [k]y = P(t) = pp_o(t), \qquad (6)$$

subject to the initial conditions $$y(t_o) = y_o, \quad \dot{y}(t_o) = \dot{y}_o. \qquad (7)$$

Under the assumption that the damping matrix is proportional to [m] and [k], the modal approach will yield $$y(t) = [G_1(t)]y(t_o) + [G_2(t)]\dot{y}(t_o) - [G_4(t)][m]\underline{e} + [G_5(t)]\underline{p} \qquad (8)$$

where $$[G_1(t)] \equiv [\phi][U(t - t_o)][Q_1]$$

$$[G_2(t)] \equiv [\phi][V(t - t_o)][Q_1]$$

$$[G_3(t)] \equiv [\phi][H(t)][\phi]^T$$

$$[G_4(t)] \equiv \int_{t_o}^{t} [G_3(t - \tau)]\ddot{S}(\tau)d\tau$$

$$[G_5(t)] \equiv \int_{t_o}^{t} [G_3(t - \tau)]p_o(\tau)d\tau$$

$$[Q_1] \equiv [M]^{-1}[\phi]^T[m]$$

[U], [V], and [H] are diagonal matrices with elements $$u_{ii}(t) = \exp(-\zeta_i\omega_i t)\left[\frac{\zeta_i}{\eta_i}\sin\omega_i\eta_i t + \cos\omega_i\eta_i t\right]$$

$$v_{ii}(t) = \exp(-\zeta_i\omega_i t)\left[\frac{1}{\omega_i\eta_i}\sin\omega_i\eta_i t\right]$$

$$h_{ii}(t) = \frac{1}{M_i}v_{ii}(t)$$

$$\eta_i = \sqrt{1 - \zeta_i^2}, \quad \zeta_i = \frac{C_i}{C_{cri}} = \frac{C_i}{2\sqrt{K_iM_i}}$$

$$[M] = [\phi]^T[m][\phi]$$

$$[C] = \alpha[M] + \beta[K] = [\phi]^T[c][\phi]$$

$$[K] = [\phi]^T[k][\phi]$$

$[\phi]$ = eigenvector matrix associated with $[m]^{-1}[k]$.

In view of the assumption that the ground excitation $\ddot{S}(t)$ can be treated during period $T_{opt}$ as a zero-mean random process, then the expected value of y(t) as given by Eq. (8) will not depend on $\ddot{S}$. Hence $$E[y(t)] = [G_1(t)]y_o + [G_2(t)]\dot{y}_o + [G_5(t)]\underline{p} \qquad (9)$$

Let the cost function to be minimized be $$J(\underline{p}) = \int_{t_o}^{T_o} \underline{\epsilon}^T(t)[w_1]\underline{\epsilon}(t)dt \qquad (10)$$

where [w₁] is an arbitrary weighting matrix. If the strain or kinetic energy of the system is to be minimized, [w₁] can be chosen as [w₁]=[m] and $\underline{\epsilon}(t) = E[y(t)]$.

Making use of Eqs. (5) and (8), Eq. (10) becomes $$J(\underline{P}_r) = \int_{t_o}^{T_o} \{G_7(t) + 2G_{10}^T(t)\underline{P}_r + \underline{P}_r^T[G_{11}(t)]\underline{P}_r\}dt \qquad (11)$$

where $G_6(t) \equiv [G_1(t)]y_o + [G_2(t)]\dot{y}_o - [G_4(t)][m]\underline{e}$ $G_7(t) \equiv G_6^T[w_1]G_6(t)$ $G_8(t) \equiv [G_5(t)]^T[w_1]G_6(t)$ $[G_9(t)] \equiv [G_5(t)]^T[w_1][G_5(t)]$ $G_{10}(t) \equiv [w_2]^T[G_5(t)][w_1]G_6(t)$ $[G_{11}(t)] \equiv [w_2]^T[G_9(t)][w_2]$ For $J(\underline{P}_r)$ to have an extremum value, $$\frac{\partial J}{\partial P_{rk}} = 0, \quad k = 1, 2, \ldots, NP. \qquad (12)$$

Application of Eq. (12) to (11) results in the optimum values of $\underline{P}_r$:

$$\hat{\underline{P}}_r = -[G_{13}]^{-1}G_{12} \qquad (13)$$

where $$G_{12} \equiv \int_{t_o}^{T_o} G_{10}(t)dt$$

$$[G_{13}] \equiv \int_{t_o}^{T_o} [G_{11}(t)]dt$$

$$G_{14} \equiv \int_{t_o}^{T_o} G_7(t)dt$$

Figure 3A:
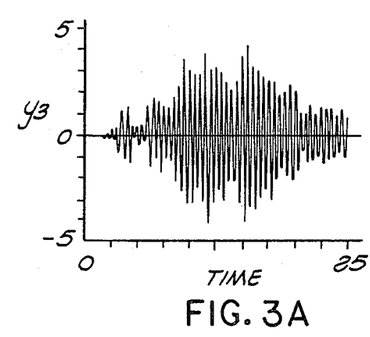
FIGS. 3A through 3C are graphs of a simulation of the motion of the three floors of the idealized structure of FIG. 2 when subjected to earthquake ground movement.
Figure 3B:
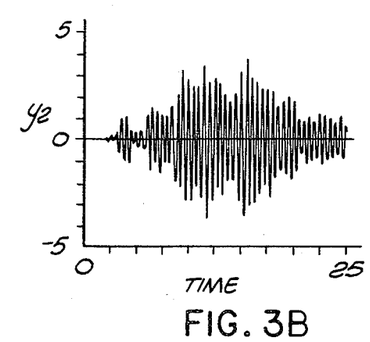
Figure 3C:
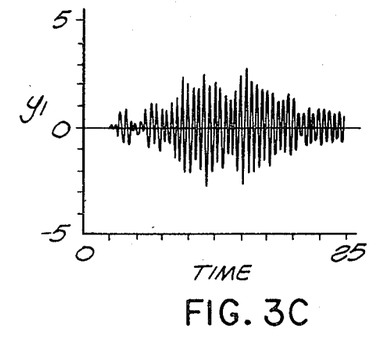

FIGS. 3A through 3C present simulated histories, over about fifty fundamental time periods, of the relative displacement, $y_i(t)$ of the three stories of the building of FIG. 2 in response to simulated earthquake ground motiion. In these figures, no control pulses $\hat{P}_r(t)$ are applied. One can observe the gradual buildup of harmonic motion, peaking about halfway through the recorded time frame.

Figure 4A:
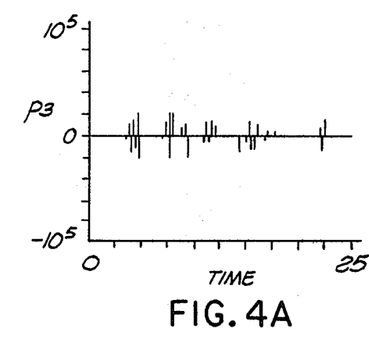
FIGS. 4A through 4C are trains of control pulses for application to the three floors of the building of FIG. 2 derived according to a first alternative method of the invention.
Figure 4B:
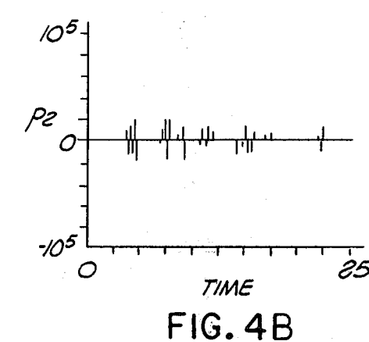
Figure 4C:
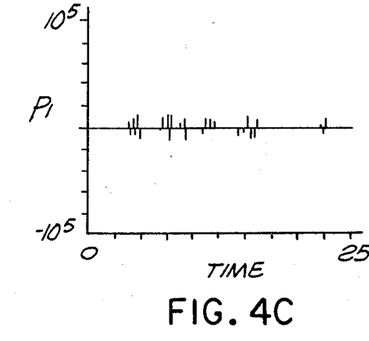

FIGS. 4A through 4C represent trains of pulses of energy $\hat{P}_r(t)$ calculated according to the foregoing mathematical analysis by the controller circuitry 14 in response to the state (deflection) of the building detected by the sensor 12. The control pulse trains are calculated individually for the first, second and third floors, respectively, of the linearized flexible structure of FIG. 2. The pulses have uniform pulse widths of 0.01 second. This represents about two percent of the period of the lowest order mode of the structure. Derived pulse magnitudes can be seen to be in the range of zero to 10,000 pounds, a feasible amount of thrust from a relatively small rocket or gas pulse generator system.

FIGS. 5A through 5C once again present histories of the movement of the three floors. Unlike the movement of FIGS. 3A through 3C, the structure in the simulation was subjected to the train of corrective pulses of FIGS. 4A through 4C. In the practice of the invention, the pulses would be applied to the building by means of the pulse generators 16, 18. The vibrations of all floors in FIGS. 5A through 5C differ from those of FIGS. 3A through 3C in that the slow buildup of amplitude formerly observed no longer exists. Further, there is observed a pattern of vibration closely bounded by preselected threshold displacements (chosen as 0.64, 0.88 and 1.0) which "trigger" the action of the controller 14 and the pulse generators 16, 18.

Figure 5A:
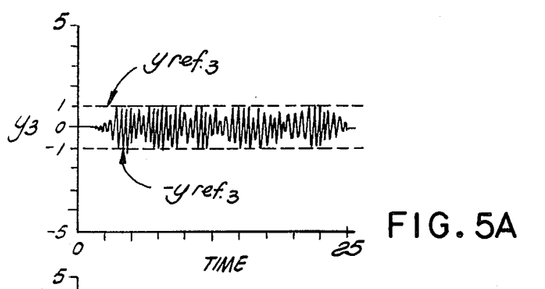
FIGS. 5A through 5C are graphs of the motion of the three floors of the idealized structure of FIG. 2 during a simulated earthquake during which the corrective pulses of FIGS. 4A through 4C were applied.
Figures 5B, 5C:
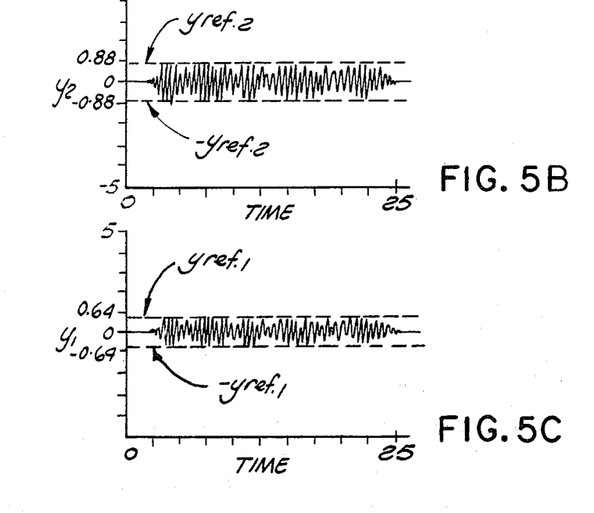

By comparing the displacements at the three levels of the model, one can see each is bounded by its selected threshold and exhibits about 35% reduction over its uncontrolled response. Additionally, a reduction of about 40 percent is attained in structure velocity. Thus the strain and kinetic energy of the building are greatly reduced by this first embodiment of the active control method.

The system of FIG. 1 may also be employed in the practice of the invention according to a second preferred method. The second method was a simplified computation of $\hat{P}_r$ to effect a corresponding reduction in the complexity of the controller circuitry 14. The pulses $\hat{P}_r(t)$ as derived for the second method reduce the motion of the structure by means of nonlinear damping as opposed to the harmonic-based method formerly disclosed.

The second control strategy does not involve analysis of the mathematical model of the structure, making it readily amenable to structures of arbitrary shape and nonlinear characteristics. In this method, a control pulse is determined at each crossover (zero deflection) point during vibration induced by a shock. The magnitude of the corrective pulse is proportional to the instantaneous velocity of the structure at this point and is of opposite direction. This is to be contrasted with the former method. Rather than disorganize regular motion, the present invention applies pulses calculated to provide optimum (maximum) damping. In addition, the method is nonharmonic, requiring no detailed knowledge of the response of the structure.

To avoid the continual application of corrective pulses (keeping in mind that a threshold of deformation need not be exceeded before computations of $\hat{P}_r$ is initiated), the control circuitry 14 is programmed to apply an activating signal to the pulse generators 16, 18 only during significant vibration. Thus the derived value of $P_r(t)$ must exceed a predetermined threshold before the signal activates the generators 16, 18. Mathematically, the algorithm of the second method may be stated:

$$p_i(t) = \begin{cases} -c_i \, \text{sgn}(v_i) \, v_i^{n_i} & t_{oi} \leq t \leq (t_{oi} + T_{di}) \\ 0 & t > t_{oi} + T_{di} \end{cases}$$

where
$c_i$ is a coefficient for scaling the needed control force at location i;
sgn ( ) indicates the sign of its argument;
$v_i$ is the absolute or relative velocity of the structure at location i, depending on the nature of the problem;
$n_i$ is some appropriate power of the velocity at location i;
$t_{oi}$ is the zero crossing time at location i;
$T_{di}$ is the time duration of the controller action at location i.

Applicant has derived and tested the damping method as a result of observations based upon pulses $\hat{P}_r(t)$ derived according to the first preferred method and by recognizing that the work done by a force p acting on a dynamic system with a a velocity v is of the form:

$$w = \int p(t) v(t) dt.$$

At zero deflection, the velocity of a vibrating structure is a maximum; hence, application of a countervailing force at such time results in a maximum reduction of the energy of the vibrating structure.

Figure 6:
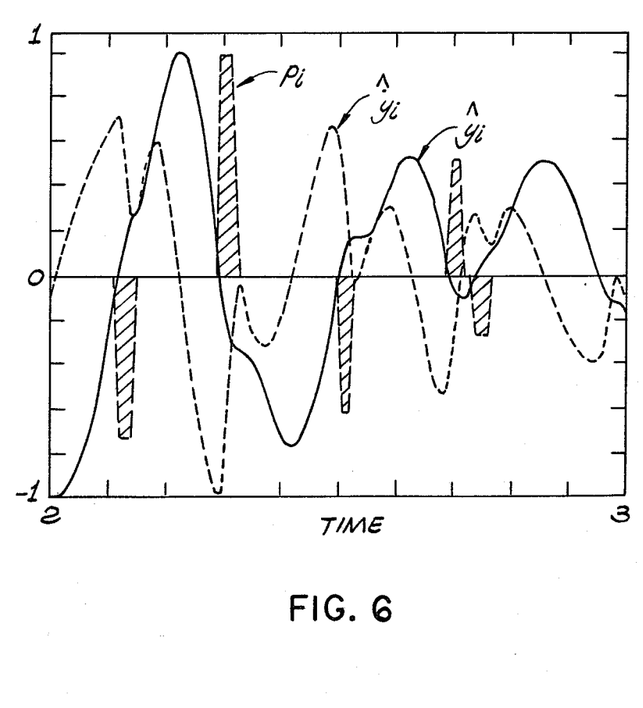
FIG. 6 is a graph of the simulated motion of a structure subject to control by means of a second algorithm incorporating the invention.

FIG. 6 shows a representative segment of the motion of an arbitrary system subjected to vibration control in accordance with the aforementioned method. The strategy employs a pulse which is a linear function of the velocity of the structure (n=1). In the figure, the relative displacement of the structure is indicated by the solid line while the relative velocity is indicated by the dashed line. A steady damping of the motion of the structure is clearly evident. This is to be contrasted with the relatively constant vibration of the structure within preselected bounds as seen in FIGS. 5A through 5C. The differing profiles reflect the alternative strategies for motion control which are realizable by means of the system of FIG. 1.

Thus it is seen that there has been brought to the structural arts new and improved methods for reducing the motion of a flexible structure subjected to shock. Employing the methods herein, one may retrofit a system as in FIG. 1 onto an existing building to mitigate the stress and damage thereto resulting from vibrations initiated by a shock such as that of earthquake ground motion. Alternate strategies may be practiced with apparatus according to the invention to disorganize harmonic movement and to damp the motion through the disclosed application of pulses of mechanical energy to the structure.

What is claimed is:

1. A method for minimizing the stress to, and/or deformation of, a flexible structure subjected to a dynamic environment comprising the steps of:
   (a) selecting a threshold state for said structure;
   (b) sensing the state of said structure in response to said dynamic environment;
   (c) transmitting the value of at least one corrective energy pulse only when the state of said structure exceeds said threshold; and
   (d) applying at least one corrective pulse to said structure within one period of its lowest mode of vibration to disorganize the buildup of the amplitude of harmonic vibrations therein.

2. A method as defined in claim 1 wherein the step of calculating the value of at least one corrective energy pulse includes:
   (a) establishing a cost function which relates stress to said at least one pulse; and
   (b) choosing the value of said at least one pulse so that the value of said cost function is a minimum.

3. A method for minimizing the stress to, and/or deformation of, a flexible structure subjected to a dynamic environment, comprising the steps of:
   (a) sensing crossover points of vibration of said structure;
   (b) determining the magnitude and direction of the velocity of vibration of said structure at each crossover;
   (c) transmitting at least one corrective energy pulse, said pulse being of opposite direction to said velocity and of magnitude which is a function of the magnitude of said velocity; and (d) applying said energy pulse to said structure at substantially said crossover point to achieve nonlinear damping of the motion of said structure.

4. A method as defined in claim 3 additionally including the steps of:
(a) establishing a threshold energy pulse; and
(b) applying said energy pulse to said structure only when its value as calculated exceeds said threshold to minimize the utilization of corrective pulse energy.

5. A system for minimizing the stress to a structure subjected to a shock, comprising:
(a) a sensor to detect the state of said structure;
(b) means responsive to the state of said structure for producing a control signal; and
(c) at least one pulse generator comprising a rocket, responsive to said signal.

6. A system as defined in claim 5 wherein said means includes a microprocessor.

7. A system for minimizing the stress to a structure subjected to a shock, comprising:
(a) a sensor to detect the state of said structure;
(b) means responsive to the state of said structure for producing a control signal; and
(c) at least one gas pulse generator responsive to said signal.

8. A system as defined in claim 7 wherein said means include a microprocessor.

9. A system for minimizing the stress to a structure subjected to a shock, comprising:
(a) a sensor to detect the state of said structure;
(b) means responsive to the state of said structure for producing a control signal;
(c) means for transmitting the value of at least one corrective energy pulse only when the state of said structure exceeds a predetermined threshold state; and
(d) means for applying at least one corrective pulse to said structure within one period of its lowest mode of vibration to disorganize the build-up of the amplitude of harmonic vibrations therein.

10. A system for minimizing the stress to a structure subjected to a shock, comprising:
(a) means for sensing crossover points of vibration of said structure;
(b) means for determining the magnitude and direction of the velocity of vibration of said structure at each crossover;
(c) means for transmitting at least one corrective energy pulse, said pulse being of opposite direction to said velocity and of magnitude which is a function of the magnitude of said velocity; and
(d) means for applying said energy pulse to said structure at substantially said crossover point to achieve nonlinear damping of the motion of said structure.

11. A building comprising, in combination:
(a) a flexible main frame; and
(b) a system of claim 9 or 10.

* * * * *

UNITED STATES PATENT AND TRADEMARK OFFICE
CERTIFICATE OF CORRECTION

PATENT NO. : 4,429,496
DATED : February 7, 1984
INVENTOR(S) : Sami F. Masri

It is certified that error appears in the above-identified patent and that said Letters Patent are hereby corrected as shown below:

In the Abstract, line 12, before "damping" should be --active--

Column 2, line 40, "guages" should be --gauges--.

Column 4, line 56, "p=col." should be --$\underset{\sim}{p}$=col.--.

Column 4, line 59, "$\underset{\sim}{p}_r$" should be --$\underset{\sim}{P}_r$--.

Column 5, line 44, there should be an equation as follows:

$$-- \omega_i = \sqrt{\frac{K_i}{M_i}} --.$$

Column 5, line 54, "y(t)" should be --$\underset{\sim}{y}(t)$--.

Column 6, line 18, "$\frac{\partial J}{\partial P_{rk}}$" should be --$\frac{\partial J}{\partial P_{r_k}}$--.

Column 6, line 24, "$G_{12}$" should be --$\underset{\sim}{G}_{12}$--.

UNITED STATES PATENT AND TRADEMARK OFFICE
CERTIFICATE OF CORRECTION

PATENT NO. : 4,429,496
DATED : February 7, 1984
INVENTOR(S) : Sami F. Masri

It is certified that error appears in the above-identified patent and that said Letters Patent are hereby corrected as shown below:

Column 7, line 50, "pi" should be --$P_i$--.

Column 7, line 50, "ni" should be --$n_i$--.

Column 7, line 50, "$t_{oi} \leqq$" should be --$t_{o_i} \leq$--.

Column 7, line 50, "$t \leqq$" should be --$t \leq$--.

Column 7, line 50, "$(t_{oi}$" should be --$(t_{o_i}$--.

Column 7, line 50, "$T_{di})$" should be --$T_{d_i})$--.

Column 7, line 51, "$t_{oi}$ +" should be --$t_{o_i}$ +--.

Column 7, line 51, "$T_{di}$" should be --$T_{d_i}$--.

Signed and Sealed this

Ninth Day of October 1984

[SEAL]

Attest:

GERALD J. MOSSINGHOFF

Attesting Officer    Commissioner of Patents and Trademarks